United States Patent
Chu et al.

(10) Patent No.: US 10,405,265 B1
(45) Date of Patent: Sep. 3, 2019

(54) CONTROLLING ACCESS TO A SHARED COMMUNICATION MEDIUM IN A WIRELESS COMMUNICATION NETWORK

(71) Applicant: Marvell International Ltd., Hamilton (BM)

(72) Inventors: Liwen Chu, San Ramon, CA (US); Lei Wang, San Diego, CA (US); Jinjing Jiang, San Jose, CA (US); Hongyuan Zhang, Fremont, CA (US); Hui-Ling Lou, Sunnyvale, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 212 days.

(21) Appl. No.: 15/374,786

(22) Filed: Dec. 9, 2016

Related U.S. Application Data

(60) Provisional application No. 62/266,177, filed on Dec. 11, 2015.

(51) Int. Cl.
| | | |
|---|---|---|
| *H04W 48/12* | (2009.01) | |
| *H04W 40/18* | (2009.01) | |
| *H04W 74/08* | (2009.01) | |
| *H04W 88/08* | (2009.01) | |

(52) U.S. Cl.
CPC .......... *H04W 48/12* (2013.01); *H04W 40/18* (2013.01); *H04W 74/0808* (2013.01); *H04W 88/08* (2013.01)

(58) Field of Classification Search
None
See application file for complete search history.

(56) References Cited

U.S. PATENT DOCUMENTS

| | | |
|---|---|---|
| 2012/0051312 A1 | 3/2012 | Noh et al. |
| 2014/0071873 A1 | 3/2014 | Wang et al. |

(Continued)

FOREIGN PATENT DOCUMENTS

| | | |
|---|---|---|
| WO | WO-2015031466 A1 | 3/2015 |
| WO | WO-2015035945 A1 | 3/2015 |
| WO | WO-2015081132 A1 | 6/2015 |

OTHER PUBLICATIONS

IEEE P802.11ah/D2.0: "Draft Standard for Information Technology—Telecommunications and information exchange between systems Local and metropolitan area networks—Specific requirements; Part 11: Wireless LAN Medium Access Control (MAC) and Physical Layer (PHY) Specifications; Amendment 6: Sub 1 GHz Licnes Exempt Operation", Jun. 2014, 562 pages.
International Application No. PCT/IB2016/053760, Invitation to Pay Additional Fees, dated Aug. 25, 2016, 8 pages.
(Continued)

*Primary Examiner* — Saumit Shah

(57) ABSTRACT

The present disclosure includes systems and techniques relating to controlling access to a shared communication medium in a wireless communication system. In some implementations, a first communication device associated with a first basic service set (BSS) identified by a first BSS indicator receives a data unit transmitted by a second communication device. The data unit includes (i) a second BSS indicator indicating a second BSS associated with the second communication device and (ii) a duration indicator indicating a duration of time for which the shared communication medium is expected to be busy. An inter-BSS channel access counter is set based on the duration of time indicated by the duration indicator if the second BSS is different from the first BSS. An intra-BSS channel access counter is set based on the duration of time indicated by the duration indicator if the second BSS is the same as the first BSS.

17 Claims, 6 Drawing Sheets

(56) References Cited

U.S. PATENT DOCUMENTS

| | | |
|---|---|---|
| 2014/0112225 A1 | 4/2014 | Jafarian et al. |
| 2015/0063190 A1 | 3/2015 | Merlin et al. |
| 2015/0173012 A1 | 6/2015 | Seok |
| 2016/0219510 A1 | 7/2016 | Asterjadhi et al. |
| 2017/0006541 A1* | 1/2017 | Huang .................. H04W 48/20 |
| 2017/0064713 A1* | 3/2017 | Barriac ............. H04W 72/0453 |
| 2017/0094685 A1* | 3/2017 | Noh .................... H04W 72/042 |
| 2017/0230149 A1 | 8/2017 | Wang et al. |
| 2018/0213558 A1* | 7/2018 | Kim ...................... H04W 74/00 |

OTHER PUBLICATIONS

International Application No. PCT/IB2016/053760, Notification of Transmittal of the International Search Report and the Written Opinion of the International Searching Authority, dated Nov. 18, 2016, 22 pages.

Khorov et al., "A survey on IEEE 802.11ah: An enabling networking technology for smart cities", Computer Communications, vol. 58, Sep. 3, 2014, pp. 53-69.

Liwen Chu et al., "Basic Service Set Color Identifier", Patent Application MP6099, 2016, 39 pages.

Matthew Fischer, IEEE P802.11-14/0396r0, LB200 Proposed Resolutions for Subclause 9.41, Dec. 27, 2013, pp. 1-42.

Minyoung Park, "IEEE P802.11 Wireless LANs", TGac Spec Framework, doc.: IEEE 802.11-yy/xxxxr06, Mar. 2012, pp. 1-13.

Minyoung Park, IEEE 802.11-13/0500r0, Proposed TGah Draft Amendment, May 9, 2013, pp. 1-311.

Yongho Seok, IEEE 802.11-14/0257r1, LB 200 clause 8 miscellaneous comment resolution, Feb. 26, 2014, pp. 1-38.

* cited by examiner

CONTROLLING ACCESS TO A SHARED COMMUNICATION MEDIUM IN A WIRELESS COMMUNICATION NETWORK

CROSS REFERENCE TO RELATED APPLICATIONS

This disclosure claims the benefit of U.S. Provisional Patent Application No. 62/266,177, filed Dec. 11, 2015, entitled "NAV RULES WITH INTRA-NAV AND INTER-NAV," the disclosure of which is hereby expressly incorporated herein by reference in its entirety.

BACKGROUND

The present disclosure describes systems and techniques relating generally to communication networks and, more particularly, to wireless local area networks (WLANs).

WLANs (e.g., WiFi networks) have evolved rapidly over the past decade. For example, the Institute for Electrical and Electronics Engineers (IEEE) has developed a family of standards, the 802.11 family of standards for WLAN, including 802.11a, 802.11b, 802.11g, 802.11n, etc. The 802.11 family of standards have evolved to provide improved data throughput and reliability for WLAN communications.

A WLAN typically includes an access point (AP) and multiple client stations. The multiple client stations can communicate with the AP over a shared communication medium (e.g., wireless channel such as a radio frequency (RF) channel). Medium access control mechanisms are used to protect one device's transmission from colliding or otherwise interfering with another device's transmission over the shared communication medium.

SUMMARY

The present disclosure includes systems and techniques relating to controlling access to a shared communication medium in a wireless communication system. According to an aspect of the described systems and techniques, a device associated with a first basic service set (BSS) identified by a first BSS indicator includes a transceiver; processor electronics coupled with the transceiver; and a non-transitory computer-readable storage medium coupled to the processor electronics and storing programming instructions for execution by the processor electronics. The programming instructions instruct the processor electronics to operate the transceiver to receive a data unit transmitted by a second communication device, wherein the data unit includes (i) a second BSS indicator, the second BSS indicator indicating a second BSS associated with the second communication device and (ii) a duration indicator, the duration indicator indicating a duration of time for which a shared communication medium is expected to be busy; check whether the second BSS is the same as the first BSS based on the second BSS indicator and the first BSS indicator; in response to the second BSS being different from the first BSS, set an inter-BSS channel access counter based on the duration of time indicated by the duration indicator; and in response to the second BSS being the same as the first BSS, set an intra-BSS channel access counter based on the duration of time indicated by the duration indicator.

According to another aspect of the described systems and techniques, a method includes receiving, at a first communication device associated with a first basic service set (BSS) identified by a first BSS indicator, a data unit transmitted by a second communication device, wherein the data unit includes (i) a second BSS indicator, the second BSS indicator indicating a second BSS associated with the second communication device and (ii) a duration indicator, the duration indicator indicating a duration of time for which the shared communication medium is expected to be busy; checking, at the first communication device, whether the second BSS is the same as the first BSS based on the second BSS indicator and the first BSS indicator; in response to the second BSS being different from the first BSS, setting, at the first communication device, an inter-BSS channel access counter based on the duration of time indicated by the duration indicator; and in response to the second BSS being the same as the first BSS, setting, at the first communication device, an intra-BSS channel access counter based on the duration of time indicated by the duration indicator.

Implementations of these aspects include one or more of the following features in some implementations. For example, the second BSS indicator and the duration indicator are included in a physical layer (PHY) preamble of the data unit.

In some implementations, one or both of the second BSS indicator and the duration indicator are included in a media access control (MAC) header of the data unit.

In some implementations, the first BSS indicator includes a first BSS color, and the second BSS indicator includes a second BSS color.

In some implementations, the duration indicator is set to indicate an expected remaining duration of a transmit opportunity (TXOP) of the second communication device, after an end of transmission of the data unit.

In some implementations, setting the intra-BSS channel access counter based on the duration of time indicated by the duration indicator includes, regardless of whether the duration of time indicated by the duration indicator is greater than a current value of the intra-BSS channel access counter, setting the intra-BSS channel access counter to be the duration of time indicated by the duration indicator.

In some implementations, setting the intra-BSS channel access counter based on the duration of time indicated by the duration indicator includes checking whether the duration of time indicated by the duration indicator is greater than a current value of the intra-BSS channel access counter; in response to the duration of time indicated by the duration indicator being greater than the current value of the intra-BSS channel access counter, setting the intra-BSS channel access counter to be the duration of time indicated by the duration indicator; and in response to the duration of time indicated by the duration indicator being not greater than the current value of the intra-BSS channel access counter, refraining from changing the intra-BSS channel access counter.

In some implementations, setting the inter-BSS channel access counter based on the duration of time indicated by the duration indicator includes checking whether the duration of time indicated by the duration indicator is greater than a current value of the inter-BSS channel access counter; in response to the duration of time indicated by the duration indicator being greater than the current value of the inter-BSS channel access counter, setting the inter-BSS channel access counter to be the duration of time indicated by the duration indicator; and in response to the duration of time indicated by the duration indicator being not greater than the current value of the inter-BSS channel access counter, refraining from changing the inter-BSS channel access counter.

In some implementations, setting the inter-BSS channel access counter based on the duration of time indicated by the duration indicator includes wherein the data unit transmitted by the second communication device includes a MAC protocol data unit (MPDU) destined to another communication device different from the first communication device, the MPDU including at least one of a receiver address (RA) or a transmitter address (TA); determining, by the first communication device, that the at least one of RA and TA is different from a MAC address of an access point with which the first communication device is associated, or the at least one of RA and TA is the same as another MAC address of another access point different from the access point with which the first communication device is associated; and the duration of time indicated by the duration indicator in the MPDU being greater than the current value of the inter-BSS channel access counter; and setting the inter-BSS channel access counter to be the duration of time indicated by the duration indicator.

In some implementations, a multi-user request to send (MU-RTS) message over a channel bandwidth is sent by the first communication device, the MU-RTS message soliciting one or more clear to send (CTS) messages to be sent from one or more other communication devices over at least part of the same channel bandwidth. Whether the one or more CTS messages have been received by the first communication device within a timeout interval is determined. In response to determining that none of the one or more CTS messages has been received by the first communication device during the timeout interval, an indicator is sent to terminate a contention-free period for accessing the shared communication medium.

In some implementations, a multi-user request to send (MU-RTS) message is received by the first communication device from a third communication device over a channel bandwidth, the MU-RTS message soliciting one or more clear to send (CTS) messages to be sent from one or more other communication devices over the same channel bandwidth. Whether an PHY entity has received a valid start of a physical packet data unit (PPDU) within a timeout interval after the first communication device receives the MU-RTS is determined. In response to determining that the PHY does not receive the valid start of the PPDU within the timeout interval after the first communication device receives the MU-RTS, one or both of the intra-BSS channel access counter and the inter-BSS channel access counter are reset.

According to another aspect of the described systems and techniques, a method includes sending, by an access point, a first frame soliciting one or more uplink (UL) responding frames to be sent from one or more communication devices to the access point; determining, by the access point, whether the one or more UL responding frames have been received by the access point within a timeout interval; and in response to determining that none of the one or more UL responding frames has been received by the access point within the timeout interval, sending, by the access point, an indicator to terminate a contention-free period for accessing the shared communication medium.

In some implementations, the first frame includes one or more of a multi-user request to send (MU-RTS) frame, a downlink (DL) OFDMA data unit, or a trigger frame that solicits an UL OFDMA data unit or an UL multi-user multiple-input-multiple-output (MU-MIMO) data unit.

In some implementations, the sending an indicator to terminate a contention-free period for accessing the shared communication medium includes sending a contention-free end frame in a legacy physical packet data unit (PPDU) or a high efficiency (HE) PPDU.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, the disclosed implementation(s) below can be implemented in various systems and apparatus, including, but not limited to, a special purpose data processing apparatus (e.g., a wireless access point, a remote environment monitor, a router, a switch, a computer system component, a medium access unit), a mobile data processing apparatus (e.g., a wireless client, a cellular telephone, a personal digital assistant (PDA), a mobile computer, a digital camera), a general purpose data processing apparatus (e.g., a minicomputer, a server, a mainframe, a supercomputer), or combinations of these.

The disclosed technologies can result in one or more of the following potential advantages. The described systems and techniques can prevent interference due to frame collision between two or more communication devices using a shared communication medium. In some implementations, the described systems and techniques can result in shorter latency and higher system throughput.

Details of one or more implementations are set forth in the accompanying drawings and the description below. Other features and advantages may be apparent from the description and drawings, and from the claims.

DRAWING DESCRIPTIONS

DETAILED DESCRIPTION

Figure 1:
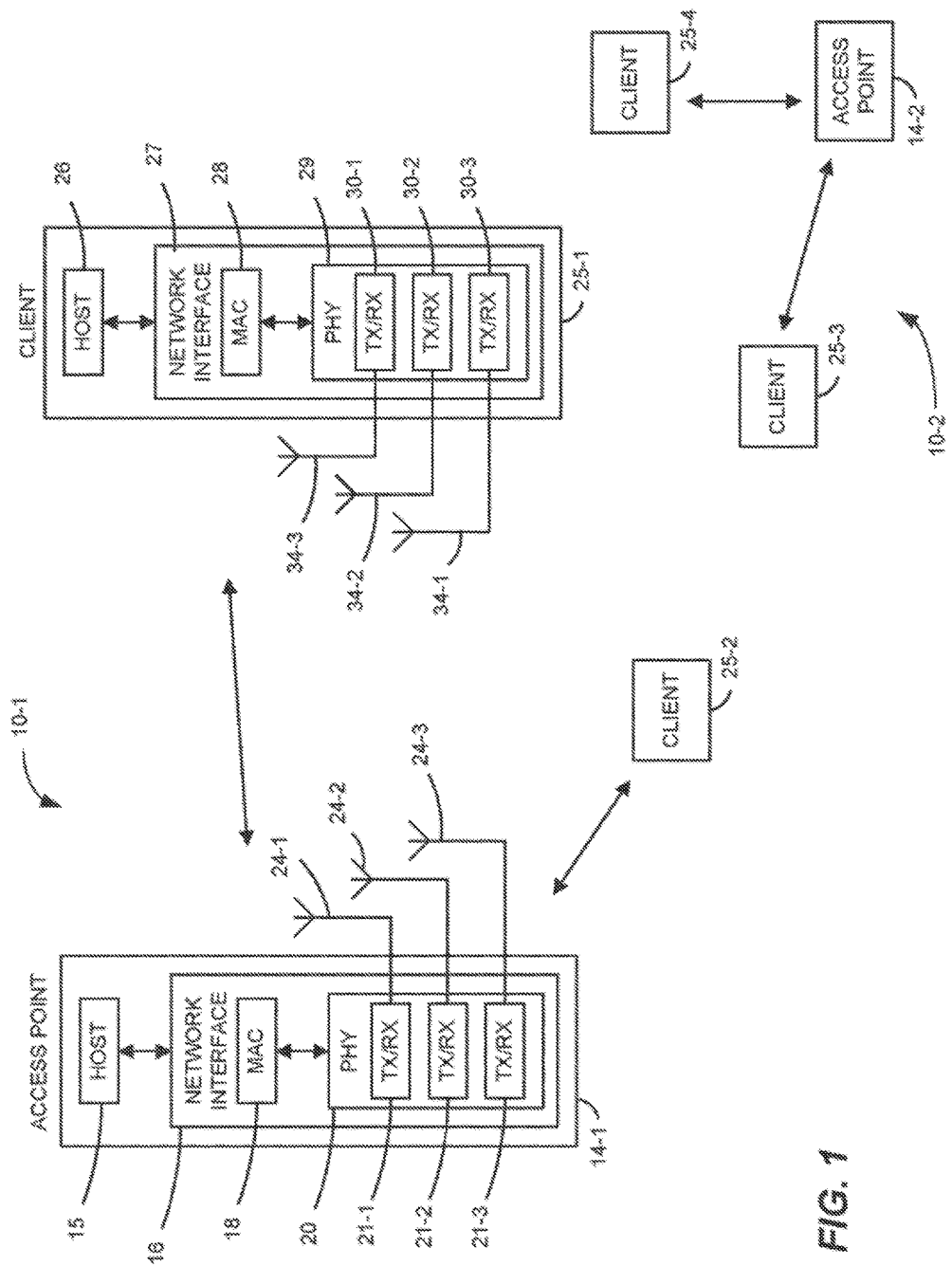
FIG. 1 is a block diagram of examples of wireless local area networks (WLANs), according to an implementation.

The systems and techniques described herein can be implemented as one or more devices, such as one or more integrated circuit (IC) devices, in a communication device (e.g., a wireless communication device, a wireline communication device, an electronic data storage device, a channel medium access access/control device). For example, the systems and techniques disclosed can be implemented in a wireless local area network (WLAN) transceiver device (e.g., a WLAN chipset) suitable for use in an orthogonal frequency division multiplexing (OFDM) multiple input multiple output (MIMO) system.

In WLAN systems, a device that is compliant with a first communication protocol (e.g., 802.11ax) receives a given transmission, such a physical layer (PHY) protocol data unit (PPDU). The transmission can be associated with a specified Basic Service Set (BSS) (e.g., as managed by an access point (AP) of the BSS). The BSS can be the source or destination of the given transmission. The specified BSS can be the same-BSS (also referred to herein as "intra-BSS" or "self-BSS") as the BSS associated with the device; or the specified BSS can be an OBSS (also referred to herein as "inter-BSS") relative to the BSS associated with the device. The identity of the BSS can be represented by a BSS identifier (BSSID) defined by the 802.11 standards.

In some implementations, the identity of the BSS can be represented by a BSS color. For example, in some of WLAN standards, such as 802.11ah and beyond, the identity of the BSS is indicated by a BSS color included in a Physical Layer Convergence Procedure (PLCP) Protocol Data Unit (PPDU). The BSS color includes a set of bits that is shorter than, but corresponds to, the BSSID. The BSS color may be contained in the Physical Layer (PHY) Signal (SIG) field in a PHY header of a PPDU, whereas the BSSID is typically included in a media access control (MAC) portion of PPDUs. A device (e.g., an AP or client) in a BSS can determine whether a PPDU is from the BSS to which the device belongs (the "same-BSS") or some other BSS (e.g., an overlapping BSS (OBSS)) by decoding the SIG field and interpreting BSS color bits included therein.

In some implementations, the device may compare a receiver address (RA) and/or a transmitter address (TA) obtained from transmission to an address of an access point (AP) associated with the BSS to which the device belongs. For example, if the RA address or the TA address obtained from the transmission is the same as the address of the AP, then the device concludes that the transmission corresponds to the same-BSS. On the other hand, if the RA address and the TA address obtained from the transmission are different from the address of the AP, then the device concludes that the transmission corresponds to an OBSS. In some implementations, the device may record the BSSID of the neighbor BSSes and the device may compare a RA and/or a TA obtained from transmission to the recorded BSSIDs of neighbor BSSes. If the RA address or the TA address obtained from the transmission matches one of the recorded BSSIDs of neighbor BSSes, then the device concludes that the transmission corresponds to the neighbor BSS.

In some instances, the device may obtain a duration value included in a given transmission. In some implementations, a device can maintain one or more channel access counters (e.g., a network access vector (NAV) counter, or simply "NAV") for determining when the device can access the shared communication medium. In some implementations, the channel access counter indicates a prediction of current and future traffic in the communication medium, in which the communication medium is occupied (e.g., the device communicates with at least one other device or two or more other devices communicate with each other using the communication medium). In some implementations, the device sets and/or updates (resets) its channel access counter based on data units that are received by the device but are addressed to other devices in the vicinity of the device. The device counts down the channel access counter, in some implementations. Once the channel access counter reaches zero, the device may begin contending for the medium. In some implementations, the device contends for the medium using a clear channel assessment (CCA) with a backoff procedure. If the medium is clear for a predetermined duration of time, then the device gains access to the medium and begins transmission in the medium, in some implementations.

In some implementations, a device can maintain at least an intra-BSS channel access counter (e.g., an intra-BSS NAV) and at least an inter-BSS channel access counter (e.g., an inter-BSS NAV). The intra-BSS channel access counter indicates a prediction of current and future traffic in the communication medium, in which the communication medium is occupied by transmissions associated with the same BSS. The inter-BSS channel access counter indicates a prediction of current and future traffic in the communication medium, in which the communication medium is occupied by transmissions associated with the OBSS.

In some implementations, the device uses the determination of whether the transmission corresponds to a same BSS or an OBSS, and the duration value obtained from the transmission, in determining whether and how to reset a value of the intra-BSS NAV or the inter-BSS NAV maintained by the device. As an example, the device determines that the received transmission corresponds to a same BSS or an OBSS based on the received BSS identifier (e.g., the BSS color) decoded from the transmission. In response to determining that the received transmission corresponds to a same BSS, the device sets or resets the intra-BSS NAV based on the duration indicated in the received transmission. In response to determining that the received transmission corresponds to an OBSS, the device sets or resets the inter-BSS NAV based on the duration indicated in the received transmission. In some implementation, the device use the value in Duration field of the received frame and the counter value of the inter-BSS NAV and intra-BSS NAV to decide whether the received frame belongs to same BSS or OBSS. If the value in Duration field of the received frame is same as the counter value of the inter-BSS NAV at the end of the received PPDU, the received frame belongs to OBSS. If the value in Duration field of the received frame is same as the counter value of the intra-BSS NAV at the end of the received PPDU, the received frame belongs to the same or self BSS.

In some implementations, the systems and techniques described herein can be implemented in multi-user (MU) and/or multiple-input-multiple-output (MIMO) wireless networks for controlling communication medium access. For example, a multi-user (MU)-RTS (request to send)/CTS (clear to send) mode or protocol can be configured. In such a mode, for example, an AP can send a MU-RTS packet to each of the multiple client stations and can receive CTS packets from one or more of the multiple client stations. The AP and the multiple client stations can each maintain and update their respective intra-BSS NAV or inter-BSS NAV based on the duration value and the BBS color included in their received transmissions, respectively. In some implementations, a contention free end (CF-End) message can be transmitted by the AP to some or all of the client stations to reset the NAV of each of the client stations.

In some implementations, a WLAN system (e.g., 802.11ax, High Efficiency WLAN (HEW) system) allows multiple users to access the communication media based on orthogonal frequency-division multiple access (OFDMA). OFDMA is a multi-user version of OFDM digital modulation scheme. Multiple access can be achieved in OFDMA by assigning subsets of subcarriers or tones to individual users. The AP can transmit downlink (DL) orthogonal frequency division multiple access (OFDMA) units or frames to the client stations and the client stations can transmit uplink (UL) OFDMA units or frames to the AP. In some implementations, a device (AP or the client station) can set its NAV (either intra-BSS NAV or inter-BSS NAV, or both) based on a received Trigger frame or a DL OFDMA frame. A trigger frame is a DL frame that solicits an UL OFDMA data unit or an UL multi-user multiple-input-multiple-output (MU-MIMO) data unit. In some implementations, a device may not be able to acquire the communication media (e.g., no responding PPDU to the Trigger or DL OFDMA frame). In this case, the AP can send a CF-End message to the multiple client stations to reset the NAV of each of the client stations.

FIG. 1 is a block diagram of example wireless local area networks (WLANs) 10-1 and 10-2, according to an implementation. Although two WLANs are illustrated in FIG. 1 for exemplary purposes, other numbers (e.g., 1, 3, 4, 5, 6, etc.) of WLANs are present in other implementations.

Each WLAN 10 includes at least one AP 14. The configuration of the AP 14 may vary among different implementations, but a typical configuration will now be described, using the AP 14-1 as an example. The AP 14-1 includes a host processor 15 coupled to a network interface 16. In some implementations, the network interface 16 includes one or more integrated circuits (ICs) configured to operate as discussed below. The network interface 16 includes a medium access control (MAC) processor 18 and a physical layer (PHY) processor 20. The PHY processor 20 includes a plurality of transceivers 21-1, 21-2 and 21-3 (collectively, transceivers 21), and the transceivers 21 are coupled to a plurality of antennas 24-1, 24-2, and 24-3 (collectively, antennas 24).

Although three transceivers 21 and three antennas 24 are illustrated in FIG. 1, the AP 14-1 includes other suitable numbers (e.g., 1, 2, 4, 5, etc.) of transceivers 21 and antennas 24 in other implementations. In some implementations, the AP 14-1 includes a higher number of antennas 24 than transceivers 21, and antenna switching techniques are utilized. In some implementations, the MAC processor 18 is implemented on at least a first IC, and the PHY processor 20 is implemented on at least a second IC. In some implementations, at least a portion of the MAC processor 18 and at least a portion of the PHY processor 20 are implemented on a single IC.

In some implementations, the MAC processor 18 and the PHY processor 20 are configured to operate according to a first communication protocol (e.g., a High Efficiency, HE, or 802.11ax communication protocol).

Each WLAN 10 includes a plurality of client stations (also referred to as STAs) 25. Although two client stations 25 in each of the WLANs 10 are illustrated in FIG. 1, each of the WLANs 10 includes different numbers (e.g., 1, 2, 3, 5, 6, etc.) of client stations 25 in various scenarios and implementations.

The configuration of the client station 25 may vary among different implementations, but a typical configuration will now be described, using the client station 25-1 as an example. The client station 25-1 includes a host processor 26 coupled to a network interface 27. In some implementations, the network interface 27 includes one or more ICs configured to operate as discussed below. The network interface 27 includes a MAC processor 28 and a PHY processor 29. The PHY processor 29 includes a plurality of transceivers 30-1, 30-2, and 30-3 (collectively, transceivers 30), and the transceivers 30 are coupled to a plurality of antennas 34-1, 34-2, and 34-3 (collectively, antennas 34). Although three transceivers 30 and three antennas 34 are illustrated in FIG. 1, the client station 25-1 includes other suitable numbers (e.g., 1, 2, 4, 5, etc.) of transceivers 30 and antennas 34 in other implementations. In some implementations, the client station 25-1 includes a higher number of antennas 34 than transceivers 30, and antenna switching techniques are utilized. In some implementations, the MAC processor 28 is implemented on at least a first IC, and the PHY processor 29 is implemented on at least a second IC. In some implementations, at least a portion of the MAC processor 28 and at least a portion of the PHY processor 29 are implemented on a single IC.

In some implementations, one or more of the other client stations of the WLANs 10 have a structure that is the same as, or similar to, the client station 25-1. In these implementations, the client stations 25 structured like the client station 25-1 have the same or a different number of transceivers and antennas. For example, the client station 25-2 has only two transceivers and two antennas (not shown), according to an implementation. These same variations may be present in the client stations 25 of the second WLAN 10-2.

In some implementations, the MAC processor 18 and the PHY processor 20 of the AP 14-1 are configured to generate data units conforming to the first communication protocol and having formats described herein. In some implementations, the MAC processor 18 is configured to implement MAC layer functions, including MAC layer functions of the first communication protocol. In some implementations, the PHY processor 20 is configured to implement PHY functions, including PHY functions of the first communication protocol. For example, in some implementations, the MAC processor 18 is configured to generate MAC layer data units such as MPDUs, MAC control frames, etc., and provide the MAC layer data units to the PHY processor 20. In some implementations, the PHY processor 20 is configured to receive MAC layer data units from the MAC processor 18 and encapsulate the MAC layer data units to generate PHY data units such as PHY protocol data units (PPDUs) for transmission via the antennas 24. Similarly, in some implementations, the PHY processor 20 is configured to receive PHY data units that were received via the antennas 24, and extract MAC layer data units encapsulated within the PHY data units. In some implementations, the PHY processor 20 provides the extracted MAC layer data units to the MAC processor 18, which processes the MAC layer data units.

The transceiver(s) 21 is/are configured to transmit the generated data units via the antenna(s) 24. Similarly, the transceiver(s) 21 is/are configured to receive data units via the antenna(s) 24. The MAC processor 18 and the PHY processor 20 of the AP 14 are configured to process received data units conforming to the first communication protocol and having formats described hereinafter and to determine that such data units conform to the first communication protocol, according to various implementations.

In some implementations, the MAC processor 28 and the PHY processor 29 of the client device 25-1 are configured to generate data units conforming to the first communication protocol and having formats described herein. In some implementations, the MAC processor 28 is configured to implement MAC layer functions, including MAC layer functions of the first communication protocol. In some implementations, the PHY processor 29 is configured to implement PHY functions, including PHY functions of the first communication protocol. For example, in some implementations, the MAC processor 28 is configured to generate MAC layer data units such as MPDUs, MAC control frames, etc., and provide the MAC layer data units to the PHY processor 29. In some implementations, the PHY processor 29 is configured to receive MAC layer data units from the MAC processor 28 and encapsulate the MAC layer data units to generate PHY data units such as PPDUs for transmission via the antennas 34. Similarly, in some implementations, the PHY processor 29 is configured to receive PHY data units that were received via the antennas 34, and extract MAC layer data units encapsulated within the PHY data units. In some implementations, the PHY processor 29 provides the extracted MAC layer data units to the MAC processor 28, which processes the MAC layer data units.

The transceiver(s) 30 is/are configured to transmit the generated data units via the antenna(s) 34. Similarly, the transceiver(s) 30 is/are configured to receive data units via the antenna(s) 34. The MAC processor 28 and the PHY processor 29 of the client device 25-1 are configured to process received data units conforming to the first communication protocol and having formats described hereinafter, and to determine that such data units conform to the first communication protocol, according to various implementations.

Figure 2:
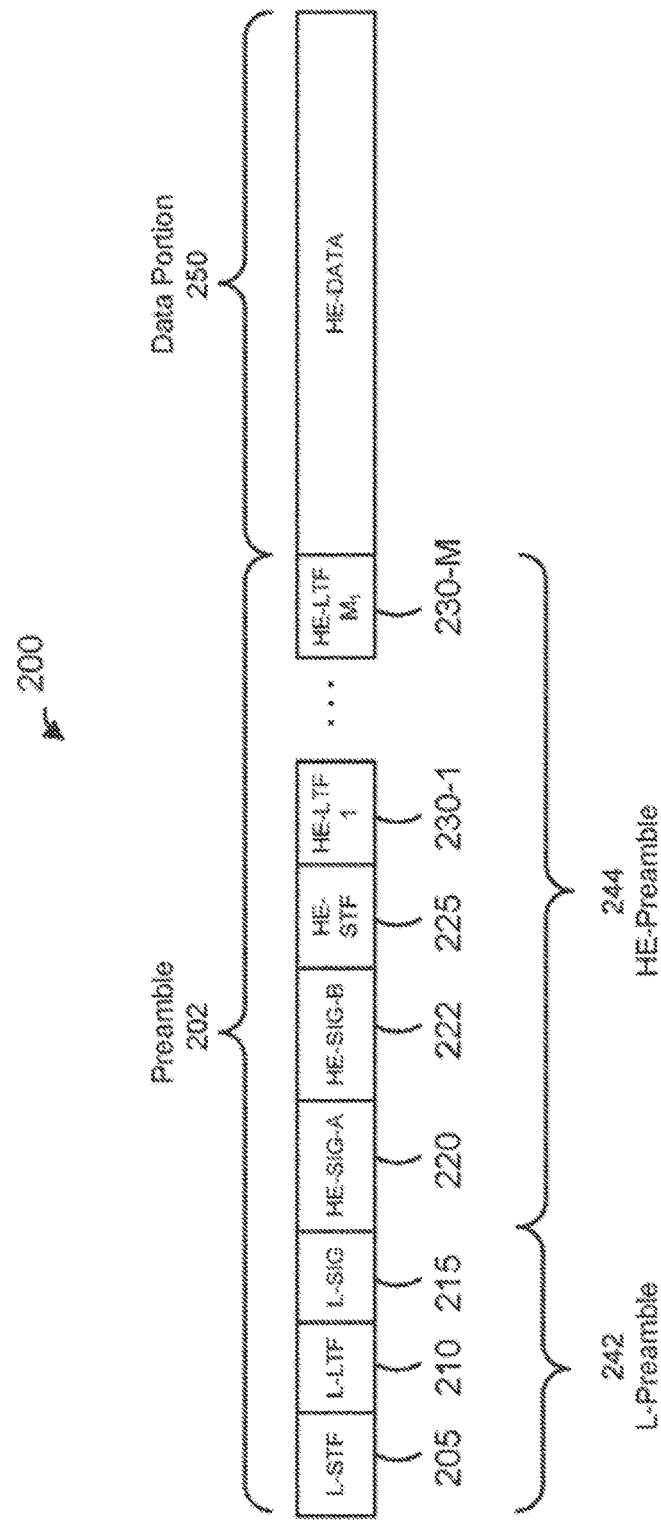
FIG. 2 is a diagram of an example of a physical layer (PHY) data unit, according to an implementation.

FIG. 2 is a diagram of an example of a physical layer (PHY) data unit 200 that an AP (e.g., the AP 14-1, the AP 14-2) is configured to transmit to one or more client stations (e.g., one or more client stations 25), according to an implementation. In some implementations, one or more client stations (e.g., one or more client stations 25-1) are also configured to transmit data units the same as, or similar to, the data unit 200 to an AP (e.g., the AP 14-1, the AP 14-2). The data unit 200 conforms to the HE communication protocol and occupies a 20 MHz bandwidth. Data units similar to the data unit 200 occupy other suitable bandwidths such as 40 MHz, 80 MHz, 160 MHz, 320 MHz, 640 MHz, for example, or other suitable bandwidths, in other implementations. The data unit 200 is suitable for mixed or hybrid mode situations, i.e., when the WLAN 10 includes a client station (e.g., the legacy client station 25-4) that conforms to a legacy communication protocol, but not the first communication protocol. The data unit 200 is utilized in other situations as well, in some implementations.

In some implementations, the data unit 200 is a multi-user (MU) data unit downlink (DL) data unit, such as a DL orthogonal frequency division multiple access (OFDMA) unit and/or DL MU multiple input multiple output (MU-MIMO) data unit. Independent data streams are transmitted in the MU DL data unit to multiple client stations 25 using respective sets of OFDM tones and/or respective spatial streams allocated to the client stations 25. Similarly, in some implementations, the data unit 200 is an MU uplink (UL) data unit, such as an UL OFDM data unit transmitted by a particular client station 25 as part of an OFDMA uplink transmission by multiple client stations 25 and/or an MU-MIMO uplink transmission, wherein each of the multiple client stations 25 transmits data using a set of OFDM tones and/or respective one or more spatial streams allocated to the client station 25. For example, in some implementations, available OFDM tones (e.g., OFDM tones that are not used as DC tones and/or guard tones) are partitioned into multiple resource units (RUs), and each of the multiple RUs is allocated to one or more client stations 25 for transmission of data to, or by, the one or more of the client stations 25. In some implementations, allocation of OFDM tones is performed using basic resource unit blocks defined by the first communication protocol. A basic resource unit block is sometimes referred to herein as simply a "basic resource unit." For example, a basic resource unit includes K OFDM tones, wherein K is an integer greater than zero, and each allocated resource unit is comprised of one or more K-OFDM tone basic resource units, in some implementations. As an example, K=26. Accordingly, a basic resource unit includes 26 OFDM tones, in this implementation. A resource unit is allocated to a client station 25, or allocated to a multi-user group of client stations 25. The resource unit includes a number of OFDM tones that are an integer multiple of 26 OFDM tones, such as 26 OFDM tones, 52 OFDM tones, 104 OFDM tones, etc., in this implementation. In another implementation, K is any suitable integer other than 26, and a basic resource unit includes a corresponding number of OFDM tones other than 26.

In some implementations, the data unit 200 is a single user OFDM data unit. For example, the data unit 200 is a DL single user OFDM data unit transmitted by an AP (e.g., the AP 14-1) to a single client station (e.g., the client station 25-1) associated with the AP. In yet another implementation, the data unit 200 is an UL single user OFDM data unit transmitted by a client station (e.g., the client station 25-1) to an AP (e.g., the AP 14-1) with which the client station is associated.

The data unit 200 includes a PHY preamble 202 including a legacy short training field (L-STF) 205, a legacy long training field (L-LTF) 210, a legacy signal field (L-SIG) 215, a first HE signal field (HE-SIG-A) 220, a second HE signal field (HE-SIG-B) 222, an HE short training field (HE-STF) 225, and M HE long training fields (HE-LTFs) 230-1, ... 230-M (collectively, LTFs 230). L-STF 205, L-LTF 210, and L-SIG 215 comprise a legacy preamble portion 242 of the PHY preamble 202. The HE-SIG-A 220, the HE-SIG-B 222, the HE-STF 225, and the M HE-LTFs 230 comprise an HE preamble portion 244 of the PHY preamble 202. In some implementations, the data unit 200 also includes a data portion 250. In some implementations, the data unit 200 omits the data portion 250.

In some implementations, the PHY preamble 202 omits one or more of the fields 205-230. For example, the PHY preamble 202 omits the HE-SIG-A 220 and/or the HE-SIG-B 222. In some implementations, the PHY preamble 202 includes additional fields not illustrated in FIG. 2.

In some implementations, each of the L-STF 205, the L-LTF 210, the L-SIG 215, the HE-SIG-A 220, the HE-SIG-B 222, the HE-STF 225, and the M HE-LTFs 230 comprises one or more OFDM symbols. The HE-SIG-A 220 and the HE-SIG-B 222 are each individually encoded to generate the respective number of OFDM symbols, in some implementations. As an example, in some implementations, the HE-SIG-A 220 comprises two OFDM symbols, and the HE-SIG-B 222 comprises one OFDM symbol. As another example, in another implementation, the HE-SIG-A 220 comprises one OFDM symbol, and the HE-SIG-B comprises two OFDM symbols. As yet another example, in some implementations, the HE-SIG-A 220 comprises two OFDM symbols, and the HE-SIG-B 222 comprises a variable number of OFDM symbols. In some implementations in which the HE-SIG-B 222 comprises a variable number of OFDM symbols, the particular number of HE-SIG-B 222 OFDM symbols in the data unit 200 is indicated in the HE-SIG-A 220.

As illustrated in FIG. 2, the data unit 200 includes one of each of the L-STF 205, the L-LTF 210, the L-SIG 215, and the HE-SIG-A 220. In other implementations in which a data unit similar to the data unit 200 occupies a cumulative bandwidth other than 20 MHz, each of the L-STF 205, the L-LTF 210, the L-SIG 215, and HE-SIG-A 220 is repeated over a corresponding number of 20 MHz sub-bands of the whole bandwidth of the data unit, in some implementations. For example, in some implementations, the data unit occupies an 80 MHz bandwidth and, accordingly, includes four of each of the L-STF 205, the L-LTF 210, the L-SIG 215, and the HE-SIG-A 220. In some implementations, in which a data unit similar to the data unit 200 occupies a cumulative bandwidth other than 20 MHz, the HE-SIG-B 222 is repeated over a corresponding number of 20 MHz sub-bands of the whole bandwidth of the data unit. In another implementation, in which a data unit similar to the data unit 200 occupies a cumulative bandwidth other than 20 MHz, the HE-SIG-B 222 includes different channel-specific portions corresponding to different 20 MHz sub-bands of the whole bandwidth of the data unit, and the different channel specific portions are transmitted in parallel in the corresponding 20 MHz sub-bands of the whole bandwidth of the data unit 200.

In some implementations, the modulation of different 20 MHz sub-bands signals is rotated by different angles. For example, in some implementations, all OFDM tones within a first subband are rotated 0-degrees, all OFDM tones within a second subband are rotated 90-degrees, a third sub-band is rotated 180-degrees, and a fourth sub-band is rotated 270-degrees. In other implementations, different suitable rotations are utilized. The different phases of the 20 MHz sub-band signals result in reduced peak to average power ratio (PAPR) of OFDM symbols in the data unit 200, in at least some implementations. In some implementations, if the data unit that conforms to the first communication protocol is an OFDM data unit that occupies a cumulative bandwidth such as 20 MHz, 40 MHz, 80 MHz, 160 MHz, 320 MHz, 640 MHz, etc., the HE-STF, the HE-LTFs, the HE-SIG-B, and the HE data portion occupy the corresponding whole bandwidth of the data unit.

In some implementations, the HE-SIG-A 220 and the HE-SIG-B 222 generally carry information about the format of the data unit 200, such as information needed to properly decode at least a portion of the data unit 200. In some implementations, the data unit 200 is a multi-user data unit, and HE-SIG-A 220 carries information commonly needed by multiple intended receivers of the data unit 200. In some implementations, HE-SIG-A 220 additionally includes information for receivers that are not intended receivers of the data unit 200, such as information needed for medium protection. On the other hand, in some implementations, HE-SIG-B 222 carries user-specific information individually needed by each intended receiver of the data unit 200. In some implementations, HE-SIG-A 220 includes information needed to properly decode HE-SIG-B 222, and HE-SIG-B 222 includes information needed to properly decode data streams in the data portion 250 of the data unit 200. In some implementations, however, HE-SIG-A field 220 includes information needed to decode the data portion 250, and HE-SIG-B 222 is omitted from the data unit 200, in at least some such implementations. In at least some implementations an AP (e.g., the AP 14) is the intended recipient of the data unit 200 (i.e., when the data unit 200 is an uplink data unit), and information needed to properly decode the data portion of the data unit 200 is known a priori to the intended recipient of the data unit 200 and need not be included in the preamble of the data unit 200. In some such implementations, the HE-SIG-B 222 is omitted from the data unit 200.

In some implementations, specific information included in the HE-SIG-A 220 and/or in the HE-SIG-B 222 depends on the mode of transmission of the data unit 200. For example, in some implementations, different information is included in the HE-SIG-A 220 when the data unit 200 is a downlink data unit, as compared to information included in the HE-SIG-A 220 when the data unit 200 is an uplink data unit. Additionally or alternatively, different information is included in the HE-SIG-A 220 when the data unit 200 is a multi-user data unit, as compared to information included in the HE-SIG-A 220 when the data unit 200 is a single-user data unit, in some implementations. In another implementation, different information is included in the HE-SIG-B 222 when the data unit 200 is a downlink data unit, as compared to the information included in the HE-SIG-B 222 when the data unit 200 is an uplink data unit.

Figure 3:
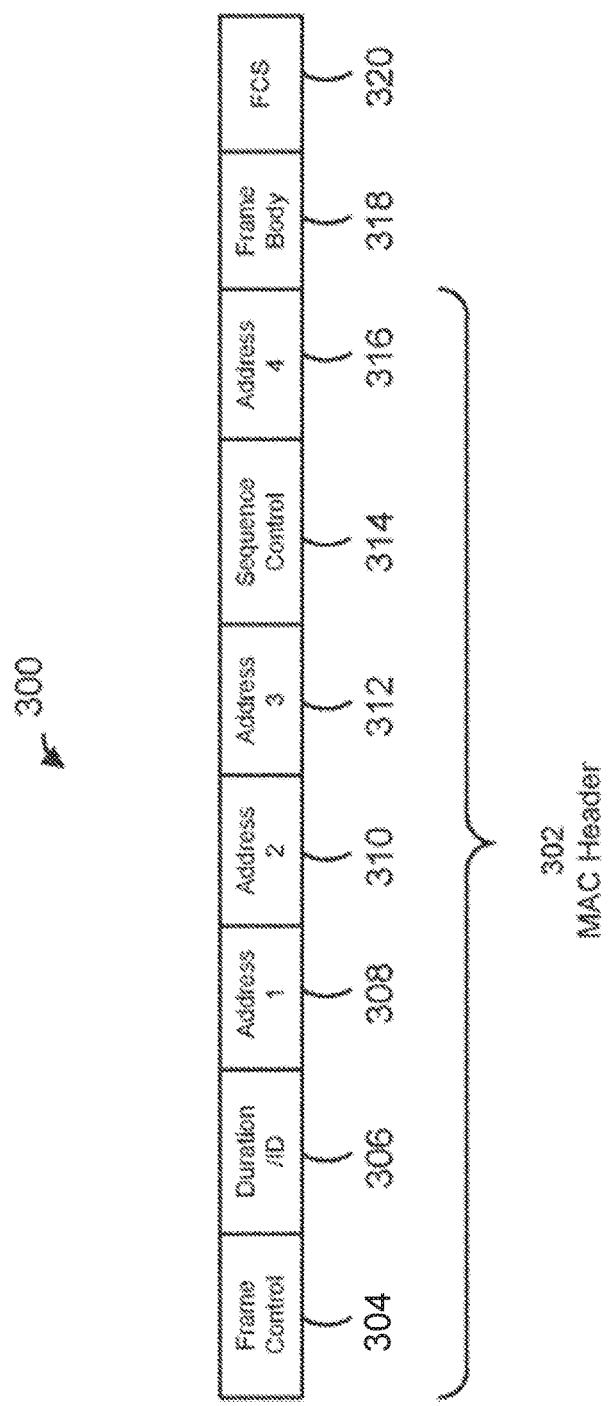
FIG. 3 is a diagram of an example of a MAC protocol data unit (MPDU), according to an implementation.

FIG. 3 is a diagram of an example MAC protocol data unit (MPDU) 300, according to an implementation. In some implementations, the data portion 250 of the data unit 200 includes one or more MPDUs, such as the MPDU 300. The MPDU 300 includes a MAC header 302 having a Frame Control field 304, a Duration/ID field 306, an Address 1 field 308, and Address 2 field 310, an Address 3 field 312, a Sequence Control field 314, and an Address 4 field 316. The MPDU 300 also includes a frame body 318 and a frame check sequence (FCS) 320. In some implementations, the Duration/ID field 306 includes an indication of a duration of time (e.g., in microseconds) needed for transmission of one or more frames that will follow the data unit 200. For example, the Duration/ID field 306 includes an indication of a duration of time needed for transmission of an acknowledgement data unit to acknowledge receipt of the data unit 200, including a duration of an interframe space between the data unit 200 and the acknowledgement data unit, to acknowledge receipt of the data unit 200. As another example, the Duration/ID field 306 includes an indication of an expected remaining duration of a transmission opportunity (TXOP) during which the data unit 200 is being transmitted, where the TXOP includes one or more additional frame exchanges, in at least some situations. As yet another example, the Duration/ID field 306 includes an indication of a duration of time needed for (i) transmission of an acknowledgement data unit to acknowledge receipt of the data unit 200, (ii) transmission of at least one additional data unit that will follow the acknowledgement data unit, and (iii) transmission of at least one additional acknowledgement data unit to acknowledge the at least one additional data unit, including interframe spaces between transmissions of the data units.

In some implementations, in at least some situations, if a device that detects or receives transmission of the data unit 200 can decode the Duration/ID field 306 included in the data unit 200, then the device utilizes the value of the Duration/ID field 306 to determine a value of a channel access counter (e.g., an intra-BSS NAV or an inter-BSS NAV) maintained by the device, such that the device will refrain from transmitting for the duration indicated by the Duration/ID field 306 to protect transmission of the frame that follows the data unit 200.

Figure 4:
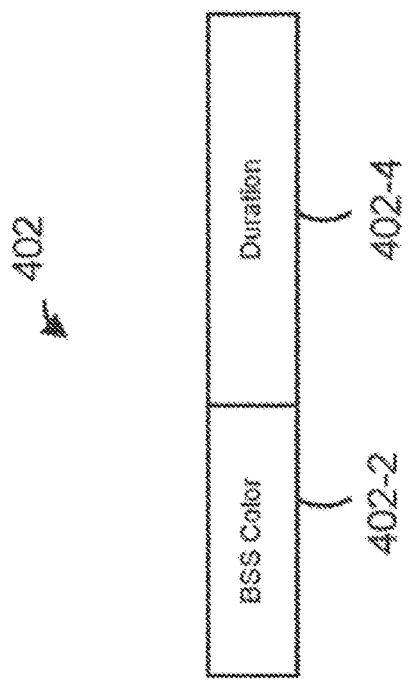
FIG. 4 is a diagram of several subfields included in a PHY preamble of a data unit, according to an implementation.

FIG. 4 is a diagram of several subfields 402 included in a PHY preamble of a data unit, according to an implementation. The subfields 402 include a BSS color subfield 402-2 and a duration subfield 402-4. In some implementations, the BSS color subfield 402-2 and the duration subfield 402-4 are included in the PHY preamble 202 of the data unit 200. For example, the BSS color subfield 402-2 and the duration subfield 402-4 are included in the HE-SIG-A 220 of the PHY preamble 202, in some implementations. In another implementation, the BSS color subfield 402-2 and the duration subfield 402-4 are included in the HE-SIG-B 222 of the PHY preamble 202. In yet another implementation, one of the BSS color subfield 402-2 and the duration subfield 402-4 is included in the HE-SIG-A 220 and the other one of the BSS color subfield 402-2 and the duration subfield 402-4 is included in the HE-SIG-B 222. In other implementations, the BSS color subfield 402-2 and the duration subfield 402-4 are included in other suitable fields (e.g., one or more other signal fields not shown in FIG. 2) of the PHY preamble 202 of the data unit 200, or are included in a PHY preamble of a suitable data unit different from the data unit 200.

In some implementations, the BSS color subfield 402-2 includes an identifier of a BSS (e.g., a BSS color) in which the data unit 200 is being transmitted. Accordingly, in some implementations, a communication device (e.g., AP 14 or client station 25) that transmits the data unit 200 sets the BSS color subfield 402-2 to include the BSS color of a BSS to which the communication device corresponds (e.g., with which the communication device is associated). Thus, for example, if the data unit 200 is transmitted by the AP 14-1 or one or the client stations 25-1, 25-2 of the WLAN 10-1, then the BSS color subfield 402-2 includes an identifier of the BSS corresponding the WLAN 10-1, in some implementations. On the other hand, if the data unit 200 is transmitted by the AP 14-2 or one of the client stations 25-3, 25-4 of the WLAN 10-2, then the BSS color subfield 402-2 includes an identifier of the BSS corresponding the WLAN 10-2, in some implementations. In some implementations, the BSS color of a BSS is shorter (e.g., includes fewer bits) than a BSSID of the BSS, where the BSSID of the BSS is an address (e.g., a MAC address) of an AP of the BSS, for example.

The duration subfield 402-4 is set to indicate a duration of time (e.g., in microseconds) for which the communication medium is expected to be busy, in some implementations. The duration subfield 402-4 indicates a duration that is the same as or similar to a duration indicated in the Duration/ID field 306, in some implementations. The duration subfield 402-4, however, includes fewer bits than a number of bits included in the Duration/ID field 306, in some implementations. In some implementations, the duration subfield 402-4 includes an indication of a duration of time (e.g., in microseconds) needed for transmission of one or more frames that will follow the data unit 200. In some implementations, the duration subfield 402-4 has different granularities for duration indication, e.g., one granularity is 8 us, another granularity is 512 us. Accordingly, the duration subfield 402-4 has one granularity indication bit. The value in remaining bits of 402-4 times the 8 or 512 will be the real duration value.

For example, the duration subfield 402-4 includes an indication of a duration of time needed for transmission of an acknowledgement data unit to acknowledge receipt of the data unit 200, including a duration of an interframe space between the data unit 200 and the acknowledgement data unit, to acknowledge receipt of the data unit 200. As another example, the duration subfield 402-4 includes an expected remaining duration of a transmission opportunity (TXOP) during which the data unit 200 is being transmitted, where the TXOP includes one or more additional frame exchanges in at least some implementations. As yet another example, the duration subfield 402-4 includes an indication of a duration of time needed for (i) transmission of the acknowledgement data unit to acknowledge receipt of the data unit 200, (ii) transmission of at least one additional data unit that will follow the acknowledgement data unit, and (iii) transmission of at least one additional acknowledgement data unit to acknowledge receipt of the at least one additional data unit, including interframe spaces between transmissions of the data units, is less than the remaining duration of the TXOP in which the data unit 200 is being transmitted, in some situations, in some implementations.

In some implementations, a communication device (e.g., an AP 14 or a client station 25) receiving a data unit decodes one or both (i) a duration indication in a PHY preamble of the data unit (e.g., included in the duration subfield 402-4 of the PHY preamble) and (ii) a duration indication in a MAC header of the data unit (e.g., included in the Duration/ID field 306 of the MAC header). In some implementations, the communication device then relies on a decoded one of (i) the duration indication in the PHY preamble of the data unit or (ii) the duration indication in the MAC header of the data unit to set or reset its NAV according to rules and techniques described herein. In some implementations, the duration indication in the MAC header of the data unit includes a greater number of bits than a number of bits of the duration indication in the PHY preamble of the data unit.

In some implementations, a smaller granularity is used to more accurately indicate the duration using the greater number of bits in the MAC header, as compared to a less accurate duration indicated using less bits and a larger granularity in the PHY preamble of the data unit. Accordingly, in some implementations, if a communication device is able to decode the duration indication in the Duration/ID field 306, then the communication device decodes the duration indication in the Duration/ID field 306 and utilizes the duration indicated in the Duration/ID field 306 to set or reset its NAV, in some implementations. Thus, for example, if the communication device decodes both (i) the duration indication in the duration subfield 402-4 included in the PHY preamble of the data unit and (ii) the duration indication in the Duration/ID field 306 included in the MAC header of the data unit, then the communication device utilizes the duration indicated in the Duration/ID field 306 to set or reset its NAV, in some implementations. On the other hand, if the communication device is unable to decode the Duration/ID field 306, then the communication device instead utilizes the duration indicated in the duration subfield 402-4 to set or reset its NAV, in some implementations.

In some implementations, a duration indication in the PHY preamble of a data unit (e.g., included in the duration subfield 402-4 of the PHY preamble) is set to an invalid value, such as all ones, for example, or another suitable invalid duration value. The invalid value of the duration indication in the PHY preamble of a data unit indicates to a communication device that receives the data unit that the communication device should ignore the duration indication in the PHY preamble of the data unit, in some implementations. Accordingly, the communication device disregards the invalid value of the duration indication in the PHY preamble and attempts to obtain a duration indication from a MAC header of the data unit (e.g., from the Duration/ID field 306 of the MAC header). If successful, the communication device then utilizes the duration indicated in the MAC header to set or reset its NAV, in some implementations.

In some implementations, each communication device (e.g., an AP 14 or a client station 25) maintains one or more channel access counters (e.g., NAV counters). For example, a communication device maintains a NAV timer (referred to as an intra-BSS NAV timer) that records intra-BSS NAV value, and one or more additional NAV timers (referred to as inter-BSS NAV timers) that record inter-BSS NAV values. In some implementations, different rules can be used to set (including reset or updated) the intra-BSS NAV timer and inter-BSS NAV timers.

With respect to the intra-BSS NAV timer, as a first example, the intra-BSS NAV timer can be set without considering whether the received duration value is larger than a current value of the intra-BSS NAV timer. The received duration value can be decoded, for example, from the Duration/ID field 306 of the MAC header or in the duration subfield 402-4 of the PHY preamble. For example, if a HE STA (e.g., the client station 25-1) decodes a HE PPDU (e.g., the data unit 200) destined to another STA (e.g., the client station 25-2) and the BSS color of the HE PPDU is same as the BSS color of the HE STA's associated AP (e.g., the AP 14-1), the HE STA will set the intra-BSS NAV with the received duration value. In some implementations, if a HE STA decodes MPDU(s) in a 802.11a/g/HT/VHT PPDU destined to another STA and the RA or TA of the MPDU is same as the HE STA's associated AP's address, the HE STA will set the intra-BSS NAV with the received duration value. In some implementations, if a HE AP (e.g., the AP 14-1) decodes a HE PPDU destined to one or more STAs and the BSS color of the HE PPDU is same as the BSS color of the HE, the HE AP will set the intra-BSS NAV with the received duration value. In some implementations, if a HE STA decodes a 802.11a/g/HT/VHT/HE PPDU and the frame in the PPDU is destined to the STA, the STA will set the intra-BSS NAV.

As a second example, the intra-BSS NAV timer can be set when the received duration value is larger than intra-BSS NAV timer value. For example, if a HE STA decodes a HE PPDU destined to another STA, the BSS color of the HE PPDU is same as the HE STA's associated AP's color and the received duration in HE SIG or MPDU is larger than the intra-BSS NAV timer's current value, the HE STA will set the intra-BSS NAV with the received duration value. In some implementations, if a HE STA decodes MPDU(s) in a 802.11a/g/HT/VHT PPDU destined to another STA and the RA or TA of the MPDU is same as the HE STA's associated AP's color and the received duration value in MPDU is larger than intra-BSS NAV timer's value, the HE STA will set the intra-BSS NAV with the received duration value. In some implementations, if a HE AP decodes a HE PPDU destined to one or more STAs, the BSS color of the HE PPDU is same as the HE AP's color and Duration in HE SIG or MPDU is larger than the intra-BSS NAV timer's value, the HE AP will set the intra-BSS NAV with the received duration value. In some implementations, if a HE STA decodes a 802.11a/g/HT/VHT/HE PPDU destined to the STA and the duration carried in the PPDU is larger than the intra-BSS NAV timer's value, the STA will set the intra-BSS NAV with the received duration value.

With respect to the inter-BSS NAV timer, in some implementations, the inter-BSS NAV can be set when the received duration value is larger than the inter-BSS NAV timer value. For example, if a HE STA decodes a HE PPDU destined to another STA, the BSS color of the HE PPDU is different from the HE STA's associated AP's color and the duration value in HE SIG or MPDU is larger than the inter-BSS NAV timer's value, the HE STA will set the inter-BSS NAV with the received duration value. In some implementations, if a HE STA decodes MPDU in a 802.11a/g/HT/VHT/HE PPDU destined to another STA, the RA or TA of the MPDU is same as the OBSS AP's MAC address and the duration value in the MPDU is larger than the inter-BSS NAV timer's value, the HE STA will set the inter-BSS NAV with the received duration value. In some implementations, if a HE STA decodes MPDU in a 802.11a/g/HT/VHT/HE PPDU destined to another STA, the frame in the PPDU has at least a RA and TA, the RA and TA of the MPDU are different from the associated AP's MAC address and the duration value in the MPDU is larger than the inter-BSS NAV timer's value, the HE STA will set the inter-BSS NAV with the received duration value. In some implementations, if a HE AP decodes a HE PPDU destined to one or more STAs, the BSS color of the HE PPDU is different from the HE AP's color and the duration value in HE SIG or MPDU is larger than the inter-BSS NAV timer's value, the HE AP will set the inter-BSS NAV with the received duration value. In some implementations, if a HE AP decodes MPDU(s) in a 802.11a/g/HT/VHT PPDU destined to another STA, the RA or TA of the MPDU is same as OBSS AP's MAC address and duration value in MPDU is larger than the inter-BSS NAV timer's value, the HE AP will set the inter-BSS NAV with the received duration value. The inter-BSS NAV will not be updated if the received duration value is smaller than, or equal to, the inter-BSS NAV timer's value.

In some implementations, multiple communication devices (e.g., an AP 14 and two or more client stations 25) of a WLAN 10 operate in a MU-RTS/CTS mode. For example, the AP (e.g., the AP 14-1) sends a MU-RTS over the shared communication medium to multiple intended receivers (e.g., client stations 25-1 and 25-2) to respond with CTS messages. If the MU-RTS/CTS rule mandates that a STA transmit a CTS using a channel bandwidth that is same as the channel bandwidth over which the MU-RTS is sent (e.g., the primary 20 MHz channel), the following transmission (e.g., transmission of DL OFDMA or Trigger frame for UL OFDMA) in the TXOP will cover the primary 20 MHz channel. In some implementations, the following NAV setting rules can be defined: If a PHY entity (e.g., the PHY processor 29) receives a valid start of a physical packet data unit (PPDU) (e.g., including a valid PHY header) within a timeout interval after a HE STA receives MU-RTS, and the NAV update by MU-RTS is from the intra-BSS (e.g., when the STA receives a MU-RTS and the MU-RTS is from the self BSS), the HE STA may reset its intra-BSS NAV. Whether the PHY entity receives a valid start of a PPDU can be determined, for example, based on whether a PHYRX-START.indication primitive (i.e., an indication by the PHY entity (e.g., the PHY processor 29) to the local MAC entity (e.g., the MAC processor 28) that the PHY entity has received a valid start of a PPDU) occurs during a timeout interval (e.g., a MU-CTSTimeout interval that indicates an interval during which the MU-CTS is expected to be received) after the HE STA receives MU-RTS. Analogously, if the PHY entity does not received the valid start of the PPDU within the timeout interval after the HE STA receives MU-RTS and the NAV update is from an inter-BSS, the HE STA may reset its inter-BSS NAV.

In some implementations, if the MU-RTS/CTS rule allows that a STA transmit CTS using part of the channel bandwidth over which the MU-RTS is sent, the following transmission (e.g., transmission of DL OFDMA or Trigger frame for UL OFDMA) in the TXOP may not cover the primary 20 MHz channel. In some implementations, the following NAV setting rules can be defined: If an AP that sends MU-RTS does not receive MU-CTS during the MU-CTSTimeout interval, the AP may send CF-End in legacy PPDU or CF-End in HE PPDU to indicate to communication devices that can detect the CF-End that the TXOP has been terminated. Accordingly, the communication devices reset the NAV (e.g., one or both of the inter-BSS NAV and inter-BSS NAV) to zero.

In some implementations, in an OFDMA system, when a device (e.g., a STA or an AP) sets NAV based on a received Trigger or DL OFDMA frame, the device may not be able to contend the medium although the OFDMA frame exchange fails. For example, when no STAs send the responding frames, the OFDMA frame exchange fails. When at least one STA sends the responding frames, the OFDMA frame exchange is successful. The failure can be caused, for example, by collision where although the AP detects idle medium, all the STAs detect busy medium. As an example, the device may not have corresponding PPDU responsive to Trigger or DL OFDMA frame. Similar to the MU-RTS/CTS frame exchange case, carrier sensing is performed before sending a responding frame. In some implementations, trigger frame has carrier sensing indication to indicate whether a STA needs to do carrier sensing before UL MU OFDMA/UL MU MIMO transmission. The STA needs to do carrier sensing before UL MU transmission if the AP asks the STA to do so. This is similar to RTS/CTS frame exchange since the responding STA needs to do carrier sensing before CTS is sent. When a neighbor STA receives a RTS/MU-RTS, the neighbor STA can figure out the transmission time of responding CTS. Accordingly, the neighbor STA can figure out a timeout value. If during the timeout period, the neighbor STA doesn't receive frames from the STA that sends RTS/MU-RTS, the neighbor STA assumes that the RTS/CTS frame exchange fails. So the neighbor STA will reset NAV. For UL MU, it is difficult to define such timeout since the UL transmission is difficult to predict. Since it is difficult to define the timeout value, the NAV may not be able to reset according to the MU-CTSTimeout interval. Instead, in some implementations, an AP sends a CF-End in a legacy PPDU or CF-End in a HE PPDU to indicate to communication devices that can detect the CF-End that the TXOP has been terminated, if the AP that sends the Trigger or DL OFDMA frame does not receive a responding frame during a timeout interval (e.g., a MU-CTSTimeout interval).

Figure 5:
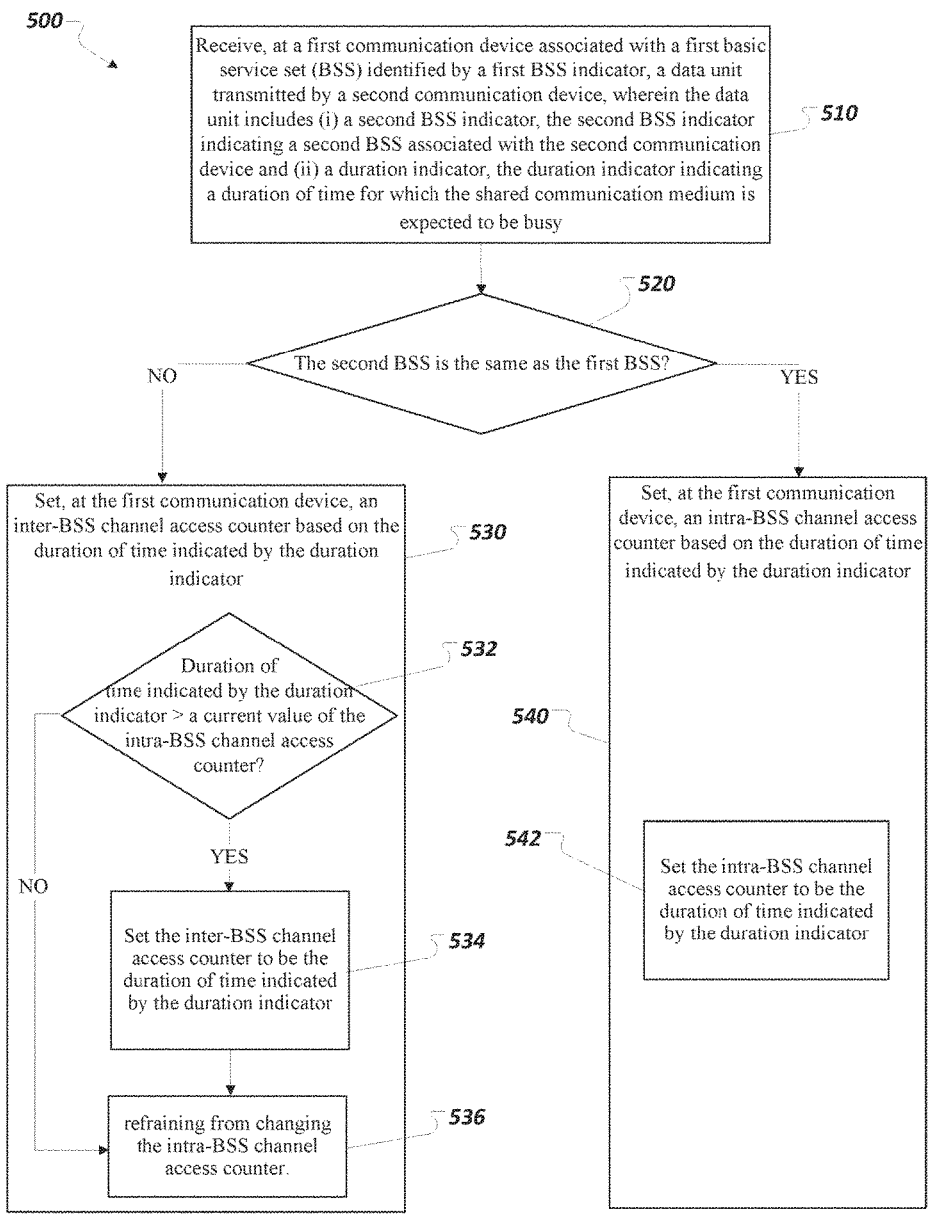
FIG. 5 is a flowchart showing a process of controlling access to a shared communication medium in a wireless communication system (e.g., a WLAN system).

FIG. 5 is a flowchart showing a process 500 of controlling access to a shared communication medium in a wireless communication system (e.g., a WLAN system). The process 500 can be performed by a wireless communication device such as the access point 14 or a client station 25 in the system 10 of FIG. 1. The device includes receiver and processor electronics for performing the process 500. In some implementations, the processor electronics include a processor programmed with computer-readable instructions that, when run, causes the receiving device to perform some or all operations of the process 500.

At 510, a data unit is received at a first communication device associated with a first basic service set (BSS) identified by a first BSS indicator. The data unit is transmitted by a second communication device. The data unit includes (i) a second BSS indicator, the second BSS indicator indicating a second BSS associated with the second communication device and (ii) a duration indicator, the duration indicator indicating a duration of time for which the shared communication medium is expected to be busy. In some implementations, The duration indicator is set to indicate an expected remaining duration of a transmit opportunity (TXOP) of the second communication device, after an end of transmission of the data unit.

At 520, whether the second BSS is the same as the first BSS is checked at the first communication device, based on the second BSS indicator and the first BSS indicator. The first BSS indicator can include a first BSSID, a first BSS color, or another identifier of the first BSS. The second BSS indicator can include a second BSSID, a second BSS color, or another identifier of the second BSS. As an example, checking whether the second BSS is the same as the first BSS based on the second BSS indicator and the first BSS indicator includes checking whether the second BSS color is the same as the first BSS color. The check can also be based on the neighbor BSS identifiers recorded by the first communication device.

In some implementations, the second BSS indicator and the duration indicator are included in a physical layer (PHY) preamble of the data unit. In some implementations, one or both of the second BSS indicator and the duration indicator are included in a media access control (MAC) header of the data unit.

At 530, in response to the second BSS being different from the first BSS, an inter-BSS channel access counter (e.g., an inter-BSS NAV) is set, at the first communication device, based on the duration of time indicated by the duration indicator.

FIG. 5 shows an example rule for setting the inter-BSS channel access counter based on the duration of time indicated by the duration indicator. At 532, whether the duration of time indicated by the duration indicator is greater than a current value of the inter-BSS channel access counter is checked. In response to the duration of time indicated by the duration indicator being greater than the current value of the inter-BSS channel access counter, at 534, the inter-BSS channel access counter is set to be the duration of time indicated by the duration indicator. In response to the duration of time indicated by the duration indicator being not greater than the current value of the inter-BSS channel access counter, at 536, the first wireless communication device refrains from changing the inter-BSS channel access counter.

For example, in some instances, the data unit transmitted by the second communication device includes a MAC protocol data unit (MPDU) destined to another communication device different from the first communication device. The MPDU including at least one of a receiver address (RA) or a transmitter address (TA). The first communication device determines that the at least one of RA and TA is different from a MAC address of an access point with which the first communication device is associated, or the at least one of RA and TA is the same as another MAC address of another access point different from the access point with which the first communication device is associated; and the duration of time indicated by the duration indicator in the MPDU being greater than a current value of the inter-BSS channel access counter. In response to such a determination, the inter-BSS channel access counter is set to be the duration of time indicated by the duration indicator.

At 540, in response to the second BSS being the same as the first BSS, an intra-BSS channel access counter (e.g., an intra-BSS NAV) is set, at the first communication device, based on the duration of time indicated by the duration indicator. In some implementations, the intra-BSS channel access counter can be set based on the duration of time indicated by the duration indicator according to different rules. As illustrated in FIG. 5, one example rule for setting the intra-BSS channel access counter based on the duration of time indicated by the duration indicator includes, regardless of whether the duration of time indicated by the duration indicator is greater than a current value of the intra-BSS channel access counter, at 542, setting the intra-BSS channel access counter to be the duration of time indicated by the duration indicator.

As another rule for setting the intra-BSS channel access counter based on the duration of time indicated by the duration indicator (not shown in FIG. 5), whether the duration of time indicated by the duration indicator is greater than a current value of the intra-BSS channel access counter is checked. In response to the duration of time indicated by the duration indicator being greater than the current value of the intra-BSS channel access counter, the intra-BSS channel access counter is set to be the duration of time indicated by the duration indicator. In response to the duration of time indicated by the duration indicator being not greater than the current value of the intra-BSS channel access counter, the first wireless communication device refrains from changing the intra-BSS channel access counter.

In some implementations, the first communication device can be an AP (e.g., the access point 14 in the system 10 of FIG. 1). The first communication device can send a multi-user request to send (MU-RTS) message over a channel bandwidth to multiple other communication devices (e.g., client stations 25 of FIG. 1). The MU-RTS message solicits one or more clear to send (CTS) messages to be sent from one or more other communication devices over at least part of the same channel bandwidth. The first communication device can determine whether the one or more CTS messages have been received by the first communication device within a timeout interval (e.g., a MU-CTSTimeout interval). In response to determining that none of the one or more CTS messages has been received by the first communication device within the timeout interval, the first communication device can send an indicator (e.g., a CF-End message) to terminate a contention-free period for accessing the shared communication medium. The one or more other communication devices can then reset their respective inter-BSS channel access counter or intra-BSS channel access counter, in response to receiving the CF-End message. In some implementations, if the communication device has both an intra-BSS NAV timer and an inter-BSS NAV timer, one of two NAV timers is reset. If the communication device has only one NAV timer, the single NAV timer can be reset. If the communication device has only one NAV timer and the communication device records whether the NAV timer is set by intra-BSS PPDU or inter-BSS PPDU, the single NAV timer can be reset if the CF-End is from same BSS as the PPDU that set the NAV timer. For example, CF-End carries transmitter's MAC address, e.g., transmitting AP's BSSID, so that a recipient can determine which NAV is to reset.

In some implementations, the first communication device is a client station (e.g., client station 25 in the system 10 of FIG. 1). The first communication device receives a multi-user request to send (MU-RTS) message from a third communication device (e.g., the AP 14 of FIG. 1) over a channel bandwidth. The MU-RTS message solicits one or more clear to send (CTS) messages to be sent from one or more other communication devices over the same channel bandwidth that the MU-RTS message is sent. Whether a PHY entity (e.g., the PHY processor 29) receives a valid start of a physical packet data unit (PPDU) within a timeout interval after the first communication device receives MU-RTS is determined by the first communication device, for example, based on whether a PHYRXSTART.indication primitive occurs within the timeout interval (e.g., a MU-CTSTimeout interval). In response to determining that the PHY does not receive the valid start of the PPDU within the timeout interval, the first communication device resets one or both of the intra-BSS channel access counter and the inter-BSS channel access counter.

In some implementations, if the PHYRXSTART.indication primitive occurs within a timeout interval (e.g., a MU-CTSTimeout interval), the STA will try to decode the received PPDU. If the received frame is CTS, the MU-RTS/CTS frame exchange is successful.

Figure 6:
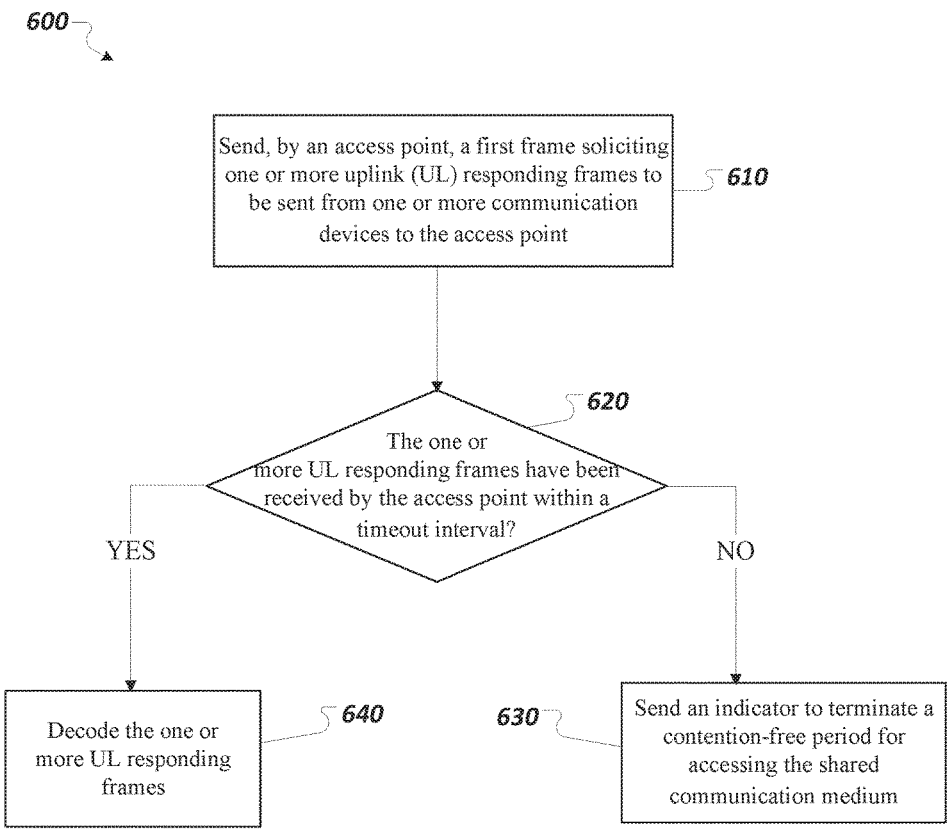
FIG. 6 is a flowchart showing another process of controlling access to a shared communication medium in a wireless communication system (e.g., a WLAN system).

FIG. 6 is a flowchart showing another process 600 of controlling access to a shared communication medium in a wireless communication system (e.g., a WLAN system). The process 600 can be performed by a wireless communication device such as the access point 14 in the system 10 of FIG. 1. The device includes receiver and processor electronics for performing the process 600. In some implementations, the processor electronics include a processor programmed with computer-readable instructions that, when run, cause the receiving device to perform some or all operations of the process 600.

At 610, a first frame is sent by an access point (e.g., the AP 14 of FIG. 1) to one or more communication devices (e.g., client stations 25 of FIG. 1). The first frame solicits one or more uplink (UL) responding frames to be sent from the one or more communication devices to the access point. For example, the first frame can include one or more of a multi-user request to send (MU-RTS) frame, a downlink (DL) OFDMA data unit, or a trigger frame that solicits an UL OFDMA data unit or an UL multi-user multiple-input-multiple-output (MU-MIMO) data unit.

At 620, determining, by the access point, whether the one or more UL responding frames have been received by the access point within a timeout interval. In some implementations, the timeout interval includes a multi-user clear to send (MU-CTS) timeout interval.

At 630, in response to determining that none of the one or more UL responding frames has been received by the access point within the timeout interval, an indicator (e.g., a CF-End message) to terminate a contention-free period for accessing the shared communication medium is sent by the access point. The indicator can be included in a legacy PPDU or a HE PPDU. Accordingly, one or more communication devices that receive and decode the indicator can reset one or both of its intra-BSS channel access counter and its inter-BSS channel access counter.

At 640, in response to determining that the one or more UL responding frames have been received by the access point within the timeout interval, the access point tries to decode the received one or more UL responding frames in the PPDUs.

A few implementations have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including, potentially, a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a standalone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular implementations. Certain features that are described in this specification, in the context of separate implementations, can also be implemented in combination, in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Other implementations fall within the scope of the following claims.

What is claimed is:

1. A method for controlling access to a shared communication medium, comprising:
    receiving, at a first communication device associated with a first basic service set (BSS) identified by a first BSS indicator, a data unit transmitted by a second communication device, wherein the data unit includes (i) a second BSS indicator, the second BSS indicator indicating a second BSS associated with the second communication device and (ii) a duration indicator, the duration indicator indicating a duration of time for which the shared communication medium is expected to be busy, wherein the duration indicator is included in a physical layer (PHY) preamble of the data unit and a medium access control (MAC) header of the data unit, and wherein the duration indicator in the MAC header includes a greater number of bits than the duration indicator in the PHY preamble;
    checking, at the first communication device, whether the second BSS is the same as the first BSS based on the second BSS indicator and the first BSS indicator;
    in response to the second BSS being different from the first BSS, setting, at the first communication device, an inter-BSS channel access counter based on the duration of time indicated by the duration indicator; and
    in response to the second BSS being the same as the first BSS, setting, at the first communication device, an intra-BSS channel access counter based on the duration of time indicated by the duration indicator.

2. The method of claim 1, wherein the second BSS indicator is included in the PHY preamble of the data unit.

3. The method of claim 1, wherein the second BSS indicator is included in the MAC header of the data unit.

4. The method of claim 1, wherein the first BSS indicator comprises a first BSS color, and the second BSS indicator comprises a second BSS color.

5. The method of claim 1, wherein the duration indicator is set to indicate an expected remaining duration of a transmit opportunity (TXOP) of the second communication device, after an end of transmission of the data unit.

6. The method of claim 1, wherein setting the intra-BSS channel access counter based on the duration of time indicated by the duration indicator comprises:
    regardless of whether the duration of time indicated by the duration indicator is greater than a current value of the intra-BSS channel access counter, setting the intra-BSS channel access counter to be the duration of time indicated by the duration indicator.

7. The method of claim 1, wherein setting the intra-BSS channel access counter based on the duration of time indicated by the duration indicator comprises:
    checking whether the duration of time indicated by the duration indicator is greater than a current value of the intra-BSS channel access counter;
    in response to the duration of time indicated by the duration indicator being greater than the current value of the intra-BSS channel access counter, setting the intra-BSS channel access counter to be the duration of time indicated by the duration indicator; and
    in response to the duration of time indicated by the duration indicator being not greater than the current value of the intra-BSS channel access counter, refraining from changing the intra-BSS channel access counter.

8. The method of claim 1, wherein setting the inter-BSS channel access counter based on the duration of time indicated by the duration indicator comprises:
    checking whether the duration of time indicated by the duration indicator is greater than a current value of the inter-BSS channel access counter;
    in response to the duration of time indicated by the duration indicator being greater than the current value of the inter-BSS channel access counter, setting the inter-BSS channel access counter to be the duration of time indicated by the duration indicator; and
    in response to the duration of time indicated by the duration indicator being not greater than the current value of the inter-BSS channel access counter, refraining from changing the inter-BSS channel access counter.

9. The method of claim 1, wherein setting the inter-BSS channel access counter based on the duration of time indicated by the duration indicator comprises:
    wherein the data unit transmitted by the second communication device comprises a MAC protocol data unit (MPDU) destined to another communication device different from the first communication device, the MPDU including at least one of a receiver address (RA) or a transmitter address (TA);
    determining, by the first communication device, that the at least one of RA and TA is different from a MAC address of an access point with which the first communication device is associated, or the at least one of RA and TA is the same as another MAC address of another access point different from the access point with which the first communication device is associated; and the duration of time indicated by the duration indicator in the MPDU being greater than a current value of the inter-BSS channel access counter; and setting the inter-BSS channel access counter to be the duration of time indicated by the duration indicator.

10. The method of claim 1, further comprising:

sending, by the first communication device, a multi-user request to send (MU-RTS) message over a channel bandwidth, the MU-RTS message soliciting one or more clear to send (CTS) messages to be sent from one or more other communication devices over at least part of the same channel bandwidth;

determining whether the one or more CTS messages have been received by the first communication device within a timeout interval; and in response to determining that none of the one or more CTS messages has been received by the first communication device during the timeout interval, sending an indicator to terminate a contention-free period for accessing the shared communication medium.

11. The method of claim 1, further comprising:

receiving, by the first communication device, a multi-user request to send (MU-RTS) message from a third communication device over a channel bandwidth, the MU-RTS message soliciting one or more clear to send (CTS) messages to be sent from one or more other communication devices over the same channel bandwidth;

determining, by the first communication device, whether a PHY entity receives a valid start of a physical packet data unit (PPDU) within a timeout interval after the first communication device receives the MU-RTS; and in response to determining that the PHY entity does not receive the valid start of the PPDU within the timeout interval after the first communication device receives the MU-RTS, resetting one or both of the intra-BSS channel access counter and the inter-BSS channel access counter.

12. A device associated with a first basic service set (BSS) identified by a first BSS indicator, the device including:

a transceiver;

processor electronics coupled with the transceiver; and a non-transitory computer-readable storage medium coupled to the processor electronics and storing programming instructions for execution by the processor electronics, wherein the programming instructions instruct the processor electronics to operate the transceiver to:

receive a data unit transmitted by a second communication device, wherein the data unit includes (i) a second BSS indicator, the second BSS indicator indicating a second BSS associated with the second communication device and (ii) a duration indicator, the duration indicator indicating a duration of time for which a shared communication medium is expected to be busy, wherein the duration indicator is included in a physical layer (PHY) preamble of the data unit and a medium access control (MAC) header of the data unit, and wherein the duration indicator in the MAC header includes a greater number of bits than the duration indicator in the PHY preamble;

check whether the second BSS is the same as the first BSS based on the second BSS indicator and the first BSS indicator;

in response to the second BSS being different from the first BSS, set an inter-BSS channel access counter based on the duration of time indicated by the duration indicator; and in response to the second BSS being the same as the first BSS, set an intra-BSS channel access counter based on the duration of time indicated by the duration indicator.

13. The device of claim 12, wherein the programming instructions instruct the processor electronics to set the intra-BSS channel access counter to be the duration of time indicated by the duration indicator.

14. The device of claim 12, wherein the programming instructions instruct the processor electronics to:

check whether the duration of time indicated by the duration indicator is greater than a current value of the intra-BSS channel access counter;

in response to the duration of time indicated by the duration indicator being greater than the current value of the intra-BSS channel access counter, set the intra-BSS channel access counter to be the duration of time indicated by the duration indicator; and in response to the duration of time indicated by the duration indicator being not greater than the current value of the intra-BSS channel access counter, refrain from changing the intra-BSS channel access counter.

15. The device of claim 12, wherein the programming instructions instruct the processor electronics to:

check whether the duration of time indicated by the duration indicator is greater than a current value of the inter-BSS channel access counter;

in response to the duration of time indicated by the duration indicator being greater than the current value of the inter-BSS channel access counter, set the inter-BSS channel access counter to be the duration of time indicated by the duration indicator; and in response to the duration of time indicated by the duration indicator being not greater than the current value of the inter-BSS channel access counter, refrain from changing the inter-BSS channel access counter.

16. The device of claim 12, wherein the programming instructions further instruct the transceiver and the processor electronics to:

send a multi-user request to send (MU-RTS) message over a channel bandwidth, the MU-RTS message soliciting one or more clear to send (CTS) messages to be sent from one or more other communication devices over at least part of the same channel bandwidth;

determine whether the one or more CTS messages have been received by the device within a timeout interval; and in response to determining that none of the one or more CTS messages has been received by the device during the timeout interval, send an indicator to terminate a contention-free period for accessing the shared communication medium.

17. The device of claim 12, wherein the programming instructions further instruct the transceiver and the processor electronics to:

receive a multi-user request to send (MU-RTS) message from a third communication device over a channel bandwidth, the MU-RTS message soliciting one or more clear to send (CTS) messages to be sent from one or more other communication devices over the same channel bandwidth;

determine whether a PHY entity receives a valid start of a physical packet data unit (PPDU) within a timeout interval after the device receives the MU-RTS; and in response to determining that the PHY entity does not receive the valid start of the PPDU within the timeout interval after the device receives the MU-RTS, reset one or both of the intra-BSS channel access counter and the inter-BSS channel access counter.

* * * * *